June 27, 1933.  G. R. FISHER  1,915,274
AIRCRAFT COMPASS
Filed May 26, 1930  2 Sheets-Sheet 1

× Radio Beacon

INVENTOR
GERHARD R. FISHER
BY
ATTORNEY

June 27, 1933.  G. R. FISHER  1,915,274
AIRCRAFT COMPASS
Filed May 26, 1930  2 Sheets-Sheet 2
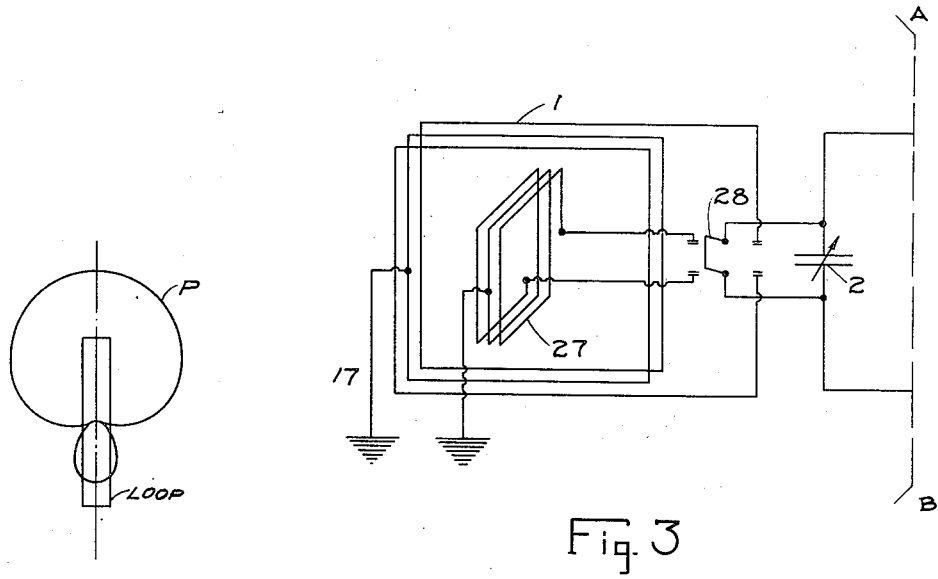
Fig. 3
Fig. 4
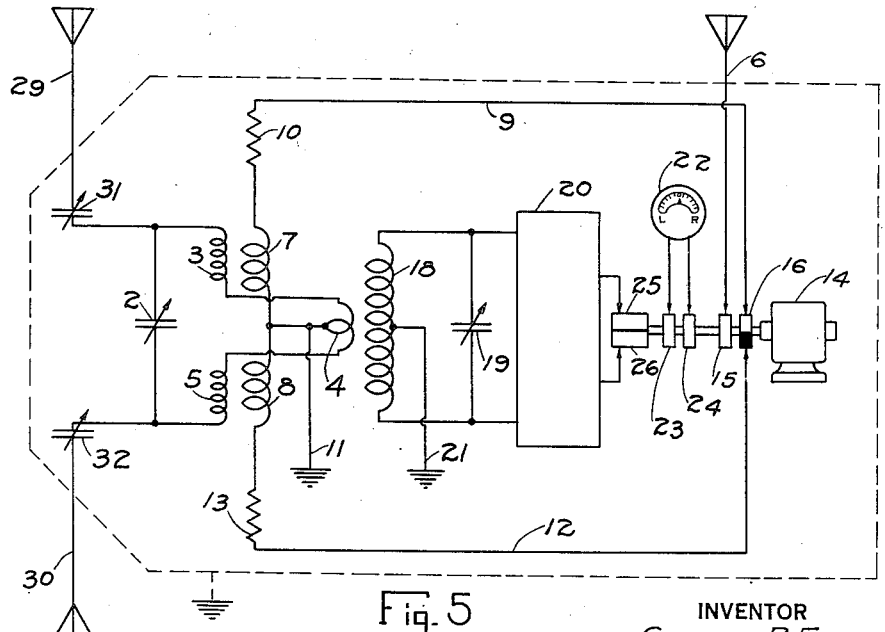
Fig. 5
INVENTOR
GERHARD R FISHER
BY
ATTORNEY Patented June 27, 1933

1,915,274

UNITED STATES PATENT OFFICE

GERHARD R. FISHER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

AIRCRAFT COMPASS

Application filed May 26, 1930. Serial No. 455,536.

This invention relates to radio direction finders and has to do more especially with devices for use on aircraft for enabling the pilot to determine the direction of a radio beacon or other source of radio waves whereby he may the more readily find his objective landing field or keep to his course when conditions are such that he does not otherwise know with certainty his precise position.

The design of a radio compass or direction finder suitable for use on aircraft, and particularly airplanes, where any manipulation which might be necessary would have to be done by the pilot, presents some problems not encountered in the design of marine radio compasses.

The ordinary marine radio compass requires manipulation by an operator in that he must first find the bearing of the station from which signals are being received and then determine the sense of direction. That is no particular detriment on ship-board where the compass operator's attention does not have to be simultaneously directed to some other task; but it would obviously be out of the question, or at least highly impracticable, for an airplane pilot to be obliged to navigate with a marine type compass. Manifestly, a radio compass suitable for use on airplanes should be fully automatic or, at any rate, so nearly so that the pilot is not obliged to divert his attention to any considerable extent from the normal business of flying his ship.

The principal object of the present invention is to devise a reliable radio compass that will operate automatically and indicate at all times (or whenever required) by visual indicating means or otherwise, whether the craft is headed in the right direction—and, if not, will indicate the direction and approximate degree of deviation from the true course.

According to the arrangement to be described hereinafter the pilot has before him a visual indicator which is operable to show whether the craft is headed directly toward its objective beacon or has shifted one way or the other from its proper course. Thus, by steering the craft so as to keep the indicator in its normal position, the pilot is enabled to keep precisely to his course and find his objective irrespective of weather conditions and irrespective of whether or not he may be familiar with the country over which he is flying. Obviously, such a device is useful even when visibility is good, if one is flying over unfamiliar country.

A further object of the invention is to provide aircraft direction finding equipment having as little weight and bulk as possible with due regard to the paramount necessity of reliability.

The basic principle underlying the aircraft radio compass to be hereinafter described is the same as that of the well known Kolster radio compass as described, for example, in United States Letters Patent No. 1,447,165 issued to Frederick A. Kolster, February 27, 1923, and other related patents to the same inventor.

In connection with the description to follow, it is to be supposed that points en route and/or landing fields constituting objective points are equipped with suitable radio transmitters, which, for convenience and apt description, will be referred to as radio beacons. It is to be considered that the pilot is at all times endeavoring to steer his craft either in a direct line toward his ultimate objective or in a direct line toward the next succeeding radio beacon along his course. In some instances, as for example on a long air mail route, there may be several radio beacons placed at intervals; or, on the other hand, there may be beacons only at the terminal landing fields. At all events it is to be supposed that the pilot is endeavoring to fly his ship as directly as possible toward a particular beacon and is accordingly trying to hold his indicator in what may be termed the "normal" position.

Some preferred embodiments of the present invention will be described hereinafter with reference to the accompanying drawings, in which:

Fig. 3 is a fragmentary circuit diagram illustrating an auxiliary provision for enabling a pilot to determine whether he is approaching or flying away from a beacon.

Fig. 4 is a polar diagram illustrating the reception effectiveness of a combined loop and open antenna.

Fig. 5 is a circuit diagram similar to Fig. 2 but showing an alternative directional antenna arrangement.

Figure 1:
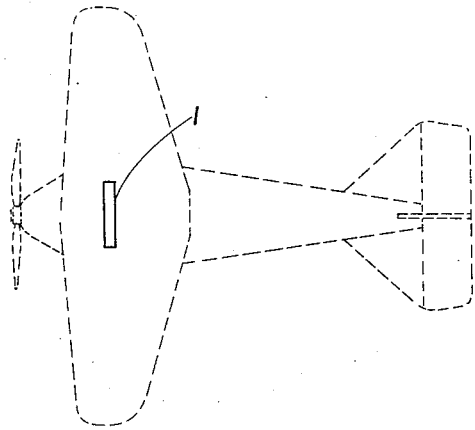
Fig. 1 depicts an airplane flying toward a radio beacon—the plane being equipped with a radio direction finder or compass, the loop antenna of which is shown mounted in the plane.

In Fig. 1 the airplane depicted in dotted lines is flying directly toward a radio beacon, which may be supposed to be radiating a high frequency continuous wave. There is shown mounted in the airplane a loop antenna (1), the magnetic axis of which is parallel to the direction of flight. As is well known, a loop antenna has a figure of eight directional characteristic so that when turned directly at right angles to the source of high frequency waves there is no response. This is due to the fact that equal and opposing currents are generated in the opposing sides of the loop.

Figure 2:
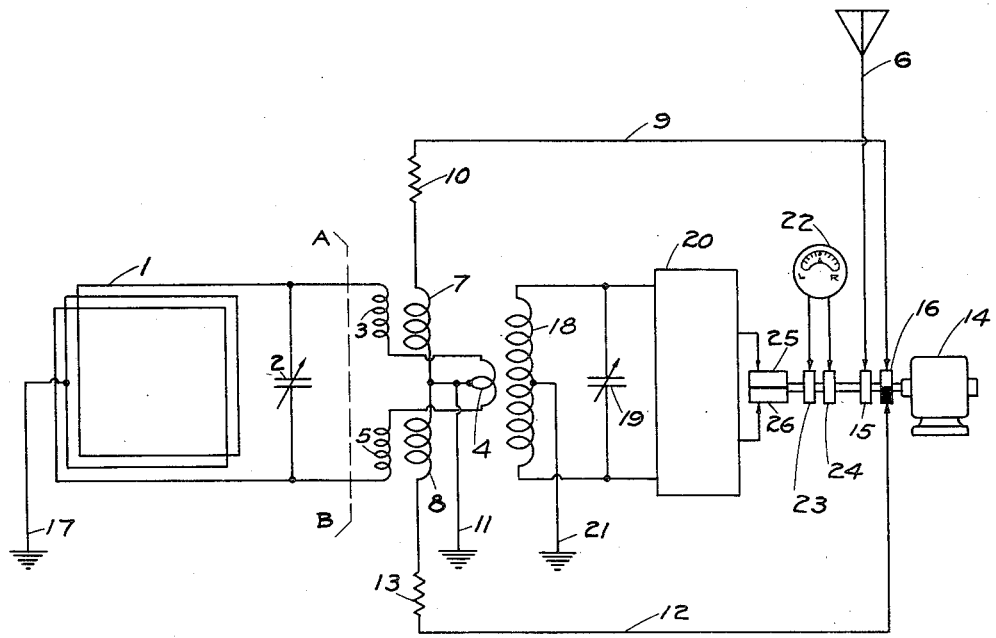
Fig. 2 is a circuit diagram of a radio direction finder or compass in accordance with one of the preferred embodiments of the invention.

In the circuit diagram Fig. 2, the loop (1) is shown in its relation to other elements and circuit connections which together comprise the aircraft radio compass or direction finder in accordance with one of the preferred embodiments of this invention.

Before proceeding further with a detailed explanation concerning Fig. 2, it is well to observe with reference to Fig. 1 that so long as the airplane is proceeding exactly toward the radio beacon, the algebraic sum of the currents induced in loop (1) is zero; that is to say, no voltage is developed across the terminals of the loop. But if the plane turns one way or the other from its normal course the algebraic sum of the currents in the loop is no longer zero but some positive value. It is apparent then that the loop, together with a suitable detector and indicating device, might be sufficient to indicate to the pilot any deviation from the true course. The difficulty is that the direction of deviation cannot be so simply indicated; and unless the pilot knows the direction of deviation, he will find it almost continuously necessary to turn his plane first one way and then the other in order to determine which way is correct. As set forth in the aforementioned Kolster patent "sense of direction" is determinable by combining the high frequency energy picked up by a loop or other directional absorber with energy from the same source picked up by a non-directional absorber such as an open antenna. In this way the well known cardioid effect is obtained.

In the arrangement of Fig. 2 the loop (1) is tuned to the beacon frequency by means of the tuning condenser (2) which is shown connected across the terminals of the loop. Across the same terminals are connected, in series, coils (3), (4) and (5). A non-directional absorber in the form of an open antenna (6) is operatively coupled with the loop (1) through the medium of coils (7) and (8) which are coupled respectively to coils (3) and (5). The open antenna circuit has two alternate paths—one path being through conductor (9), resistance (10), coil (7), and conductor (11) to ground. The other open antenna path is through conductor (12), resistance (13), coil (8), and conductor (11) to ground. Conductors (9) and (12) are connected alternately at a relatively rapid rate to the antenna (6) through the medium of a suitable reversing switch, which, in the present instance, is a rotating switch driven by motor (14).

The rotating conductive ring (15) forming a part of the switching device is conductively connected in any suitable manner to a semi-circular conductor (16) which is likewise mounted on the motor shaft whereby contact is made alternately with conductors (9) and (12).

The loop (1) is grounded at its electrical center through conductor (17) and the midpoint of the coil (4), which is at the electrical mid-center between the terminals of the loop, is likewise grounded. The resistance elements (10) and (13) are not critical but should usually be of the order of 5000 ohms. These render the open antenna circuit aperiodic, which, though not essential, is generally very desirable in the arrangement herein described. These resistances also serve to bring the open antenna substantially into phase with the loop antenna.

It will be apparent that the current induced in coil (3) from the open antenna circuit, that is from coil (7), will either aid or oppose the current in that side of the loop circuit in which coil (3) is included. The same is of course true with respect to the current induced into the coil (5) from the open antenna circuit. Now it will be evident that if the airplane shown in Fig. 1 is proceeding directly toward the radio beacon so that the currents induced directly into the loop oppose each other, the effective current in the coil (4) will be that induced from the open antenna or non-directional absorber. Under those circumstances each impulse transmitted by the coil (4) into the secondary winding (18) is equal to the preceding impulse and likewise the succeeding one. If, now, it is supposed that the plane has deviated to some extent from its true course, it follows that the loop (1) is no longer normal to the line of radiation and that accordingly the currents set up in the loop by direct pick-up no longer cancel each other. Under the condition last assumed, the current in one side of the loop will aid the current induced therein from the open antenna, whereas the current directly generated in the other side of the loop will oppose the current induced therein from the open antenna. Hence we have a condition where the succeeding impulses in coil (4) and consequently in coil (18) are not equal. Successive impulses in that case may be large and small respectively and the difference in magnitude will be somewhat proportional to the degree of deviation from the true course.

Coil (18), together with tuning condenser (19), forms a tuned input circuit to a detector and amplifier indicated symbolically by the rectangle (20). This may be a vacuum tube detector and amplifier of conventional form and of any desirable number of stages as will be understood by those skilled in the art. The tuned input circuit comprising coil (18) and condenser (19) is preferably grounded at its electrical center through a conductor (21).

The object now is to compare the successive impulses heretofore referred to and thereby obtain an indication, visual or otherwise, as to the direction and degree of deviation from the true course. A suitable indicator for this purpose may be of the form of a voltmeter so arranged that its pointer normally takes a mid position on the scale—the scale being suitably calibrated or provided with whatever markings may be wanted. Such an indicator is designated by reference numeral (22).

Mounted on the shaft of the motor (14), and in addition to conductor elements (15) and (16), are shown a pair of ring conductors (23), (24) which are connected respectively to the half circular segments (25), (26). Segments (25) and (26) are insulated from each other and from the shaft of the motor and rotate together with elements (23), (24), (15) and (16). It will be manifest that the output current from the detector amplifier combination (20) is recurrently reversed through the indicator (22). There are therefore rapid reversals of current through the indicator (22), which reversals occur synchronously with the reversals of the open antenna connections previously described. If the successive impulses of current through indicator (22) are of equal magnitude, it is apparent that the indicator will not respond—providing the rate of reversal is rapid enough so that the indicator cannot follow them. In other words, the indicator should have sufficient inertia so that the pointer will not wabble, or, what amounts to the same thing, the frequency of reversal should be high enough to prevent wabbling of the pointer. Each successive impulse transmitted to the indicator tends to move the pointer from its normal position in a given direction. That is, one impulse tends to move the pointer in one direction, say to the right, while the next impulse tends to move it to the left. Equal impulses will cancel each other in their effect on the indicator, but any deviation from equality will be manifested by a deflection of the pointer to the right or the left depending upon the direction of the superior current through the winding of the indicator.

There is no manipulation required on the part of the pilot except that in some cases it will be necessary to adjust the tuning condensers (2) and (19) when he has passed one beacon and is about to continue toward a successive one. Inasmuch as the several beacons which may be provided on a long route should preferably be operated at different frequencies, it would in such case be necessary for the pilot to retune the radio compass as each beacon is passed. The two condensers (2) and (19) may be mounted on a common shaft or otherwise rendered simultaneously operable, and, of course, their dials may be appropriately calibrated so that tuning to a given beacon is but a momentary operation.

It will be more or less apparent that should the pilot unknowingly pass his objective beacon and continue flying away from it, the compass will still operate and the pilot might as a result become confused if some means were not provided for determining whether he is approaching a beacon or leaving it. This can be done either by making the loop (1) rotatable through an angle of 90 degrees so as to bring its magnetic axis normal to the direction of flight or it may be accomplished by means of an additional fixed loop arranged at an angle of 90 degrees to loop (1). The latter arrangement is depicted in Fig. 3—a fragmentary circuit diagram which should be considered as substituted for that portion of Fig. 2 to the left of line A—B. In Fig. 3 there is shown an auxiliary fixed loop antenna (27) having its magnetic axis at right angles to that of loop (1). A reversing switch (28) provides for shifting from one loop to the other. When the pilot wishes to ascertain whether he is approaching or flying away from a particular beacon he connects in loop (27) whereupon indicator (22) will deflect one way or the other. It is determined in advance whether a deflection to the right means approaching or flying away from the beacon. A deflection to the left would have the opposite significance.

The combination of loop and open antenna wherein the loop is turned with its magnetic axis normal to the line of wave propagation gives a response which may be appropriately illustrated by a cardioidal curve P as shown in Fig. 4. With the antenna coupled to one side of the loop, the response is stronger than when the antenna is coupled to the other side. This is because in the one case the antenna current aids the loop current whereas in the other case the opposite result obtains. By comparing the effects with the antenna coupled alternately to the two sides of the loop the general direction of the beacon is obtainable.

Fig. 5 illustrates an alternative arrangement in which a pair of spaced open antennæ (29) and (30) are employed instead of a loop antenna. In each of the antennæ (29) and (30) there is included a phasing condenser (31) and (32) respectively. This arrangement is advantageous at very high frequencies for which it would be difficult to design a suitable loop. The antennæ (29) and (30) should preferably be extended horizontally at right angles to the line of flight. They have directional characteristics similar to that of a loop antenna. Fig. 5 is otherwise identical with Fig. 2 and corresponding reference numerals are accordingly employed.

In practice all the equipment and circuit connections except those parts of the antennæ and loops which function to pick up high frequency waves from the ether should be thoroughly shielded and the shielding grounded. Shielding is indicated by the dotted line enclosure in Fig. 5. Similar shielding should be applied to the arrangement of Fig. 2.

While in this specification particular emphasis has been put on the subject of aircraft direction finders, it will be apparent that the invention herein described is applicable for other purposes. It would, for example, be entirely satisfactory for marine use; but, as pointed out, the refinements essential for aircraft use are not essential for marine use—at least on large vessels.

The invention herein described is obviously susceptible of embodiment in a variety of forms and modifications, and it should not be construed as limited except by the scope of the appended claims.

What is claimed is:

1. A radio direction finder for navigable craft comprising a directionally responsive antenna in combination with a non-directional aperiodic antenna, coupling means for inductively combining high frequency signal energy received by said antennæ, commutating means for periodically reversing the relative phase relationship of the high frequency signal energy in said coupling means, an indicating instrument responsive to the combined signal energy for indicating the direction of a deviation of the craft from its true course, and additional commutating means operable synchronously with said first-mentioned commutating means for periodically reversing the connections of said instrument.

2. A radio direction finder comprising a directionally responsive antenna in combination with a non-directional aperiodic antenna, said antennæ, being adapted to receive high frequency signal energy from a given source, coupling means for inductively combining the energy received by said antennæ, commutating means for periodically causing the energies supplied to said coupling means by the antennæ to be first in phase and then in phase opposition, and an instrument responsive to the combined signal energy for indicating the directional deviations of said direction finder.

3. A radio direction finder for navigable craft comprising a loop antenna having the usual directional receiving characteristics, said loop antenna being mounted with its magnetic axis parallel to the line of travel of the craft, a non-directional aperiodic antenna mounted on the craft, means for rapidly and periodically combining the energy received by said loop with that received by said non-directional aperiodic antenna, said means being effective to produce substantially equal cardioid effects during successive periods only if the source of high frequency wave energy being received is in line with the magnetic axis of said loop antenna, means for reversing the electrical relationship between said loop and said non-directional aperiodic antenna, means for detecting the combined high frequency energies, and an indicating device operable in response to the detected energy to compare the cardioid effects during successive periods and to indicate as a result of such comparison the direction of any deviation of the craft from its true course.

4. A radio direction finder for navigable craft comprising a loop antenna having the usual directional receiving characteristics, said loop antenna being grounded at its center, a non-directional aperiodic antenna arranged to be coupled alternately with either side of said loop antenna, switching means for rapidly alternating the coupling between said non-directional antenna and the two sides of said loop antenna, whereby the high frequency energy picked up by said non-directional aperiodic antenna is combined periodically in successively different ways with the high frequency energy picked up by said loop antenna, means for detecting the periodically combined successive impulses of high frequency energy, an indicating instrument responsive to the detected periodic impulses and switching means for reversing the connection of said instrument to said detecting means synchronously with the reversals of coupling between said non-directional aperiodic antenna and said loop antenna.

5. The combination of a directional absorber of radio energy having a figure of eight characteristic, an untuned non-directional absorber of radio energy, means for combining the signal energies from the two said absorbers, means for periodically reversing the phase of the oscillatory currents in one of said absorbers with respect to those of the other absorber, a detector for the combined signal energies from the two said absorbers, an output circuit for said detector, an indicating device arranged to be energized by current from said detector, and means for periodically reversing the current through said indicating device simultaneously with reversals of phase relation between said oscillatory currents.

6. A radio direction finder comprising two loop antennæ having their planes mutually at right angles, means for tuning said loop antennæ, a non-directional aperiodic antenna, means for combining the signal energy in said non-directional aperiodic antenna with that in either of said loop antennæ selectively, means for periodically reversing the phase relationship between said non-directional antenna and its operatively associated loop antenna, a detector for the combined signal energies from the operatively associated antennæ, an output circuit for said detector, an indicating instrument responsive to the current from said detector, and switching means operable synchronously with said phase reversing means for periodically reversing the direction of current flow through said instrument.

7. A radio direction finder for navigable craft comprising a tuned loop antenna having its magnetic axis parallel to the line of travel of the craft, a second tuned loop antenna having its magnetic axis normal to the line of travel of the craft, switching means for conditioning said loop antennæ for operation individually and selectively, a non-directional aperiodic antenna, means for electrically coupling the aperiodic antenna with that one of said hoop antennæ which is conditioned for operation, means for operatively associating said non-directional antenna to the first-mentioned one of said loop antennæ, means responsive to the resultant combined energy for determining directional deviations of said craft, means for operatively associating said non-directional antenna to said second-mentioned loop antenna, means responsive to the resultant combined energy for determining whether a co-operating radio beacon is forward or aft of the craft, and an indicating instrument operable in response to energy picked up by said non-directional aperiodic antenna and said first-mentioned loop antenna conjointly to indicate directional deviation.

8. The combination of a tuned loop antenna circuit having directional receiving characteristics of a loop antenna, an aperiodic non-directional antenna, both antennæ being adapted to absorb radio energy, means for combining the energy received by said absorbers, means for detecting the combined resultant signal energies from said absorbers, an output circuit for said detecting means, an indicating device adapted to be energized by current from said detector output circuit, and means for alternately coupling said aperiodic antenna to either side of said loop circuit while simultaneously changing the polarity of said indicating device.

In testimony whereof, I have hereunto set my hand.

GERHARD R. FISHER.